(12) United States Patent
Bryan

(10) Patent No.: US 11,113,178 B2
(45) Date of Patent: Sep. 7, 2021

(54) EXPOSING AND REPRODUCING SOFTWARE RACE CONDITIONS

(71) Applicant: EMC IP Holding Company LLC, Hopkinton, MA (US)

(72) Inventor: Matthew Bryan, Olympia, WA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 16 days.

(21) Appl. No.: 16/236,028

(22) Filed: Dec. 28, 2018

(65) Prior Publication Data
US 2020/0210318 A1 Jul. 2, 2020

(51) Int. Cl.
*G06F 11/36* (2006.01)

(52) U.S. Cl.
CPC ................ *G06F 11/3632* (2013.01)

(58) Field of Classification Search
CPC .. G06F 16/178; G06F 16/275; G06F 16/1774; G06F 9/52; G06F 9/522; G06F 9/30087; G06F 9/526; G06F 11/3632
See application file for complete search history.

(56) References Cited

U.S. PATENT DOCUMENTS

| | | | |
|---|---|---|---|
| 9,135,082 B1 * | 9/2015 | Sheng ................. | G06F 11/28 |
| 2008/0195615 A1 * | 8/2008 | Rowley ............... | G06F 16/2343 |
| 2010/0131931 A1 * | 5/2010 | Musuvathi ........... | G06F 11/366 |
| | | | 717/128 |
| 2011/0320745 A1 * | 12/2011 | Zhang ................. | G06F 11/3636 |
| | | | 711/154 |
| 2012/0204062 A1 * | 8/2012 | Erickson ............. | G06F 11/3636 |
| | | | 714/35 |
| 2014/0189699 A1 * | 7/2014 | Omara ................. | G06F 9/526 |
| | | | 718/103 |
| 2016/0110283 A1 * | 4/2016 | Iyigun ................. | G06F 12/084 |
| | | | 711/130 |
| 2017/0046207 A1 * | 2/2017 | Krauss ................. | G06F 9/52 |

OTHER PUBLICATIONS

Stack Overflow; Definition of "synchronization primitive"; Stack Overflow; 1 page. (Year: 2011).*
Chen Tian et al.; Dynamic Recognition of Synchronization Operations for Improved Data Race Detection; ACM; pp. 143-153; retrieved on May 11, 2021 (Year: 2008).*
Robert H. B. Netzer et al.; Improving the Accuracy of Data Race Detection; ACM; pp. 133-144; retrieved on May 11, 2021 (Year: 1991).*

* cited by examiner

*Primary Examiner* — S. Sough
*Assistant Examiner* — Cuong V Luu
(74) *Attorney, Agent, or Firm* — Amin, Turocy & Watson, LLP

(57) ABSTRACT

Exposing and reproduction of race conditions is presented herein. A method identifies a synchronization mechanism of a grouping of operating system synchronization mechanisms; based on a tunable probability value, adjusts a race window associated with the synchronization mechanism; and based on the race window, raises a likelihood of revealing a race condition.

20 Claims, 10 Drawing Sheets

EXPOSING AND REPRODUCING SOFTWARE RACE CONDITIONS

TECHNICAL FIELD

The subject disclosure generally relates to embodiments for revealing, exposing, and reproducing race conditions.

BACKGROUND

Race conditions are a class of software bugs that can be difficult to find and reproduce at runtime. A race condition can occur in software in execution, such as a complex software application, when an output of the software in execution is dependent on a sequence or timing of events exogenous to the software in execution. For instance, race conditions can occur when a first software in execution, in order to provide its output, is dependent on an operation executed by a second software in execution, wherein the first software will behave in unintended ways where the second software in execution does not complete its operation in a timely manner. For example, the first software in execution can presume that a hard drive device is operational, while the second software in execution is responsible for ensuring that the hard drive device is operational. Thus, if the second software in execution fails to ensure that the hard drive device is operational before the first software in execution attempts to access the hard drive device, a race condition can be said to have occurred. Race conditions are generally difficult to detect and/or reproduce. Further, race conditions in software in execution have now become more common due to the ubiquitous use of multithreading.

BRIEF DESCRIPTION OF THE DRAWINGS

Non-limiting embodiments of the subject disclosure are described with reference to the following figures, wherein like reference numerals refer to like parts throughout the various views unless otherwise specified.

DETAILED DESCRIPTION

Figure 1:
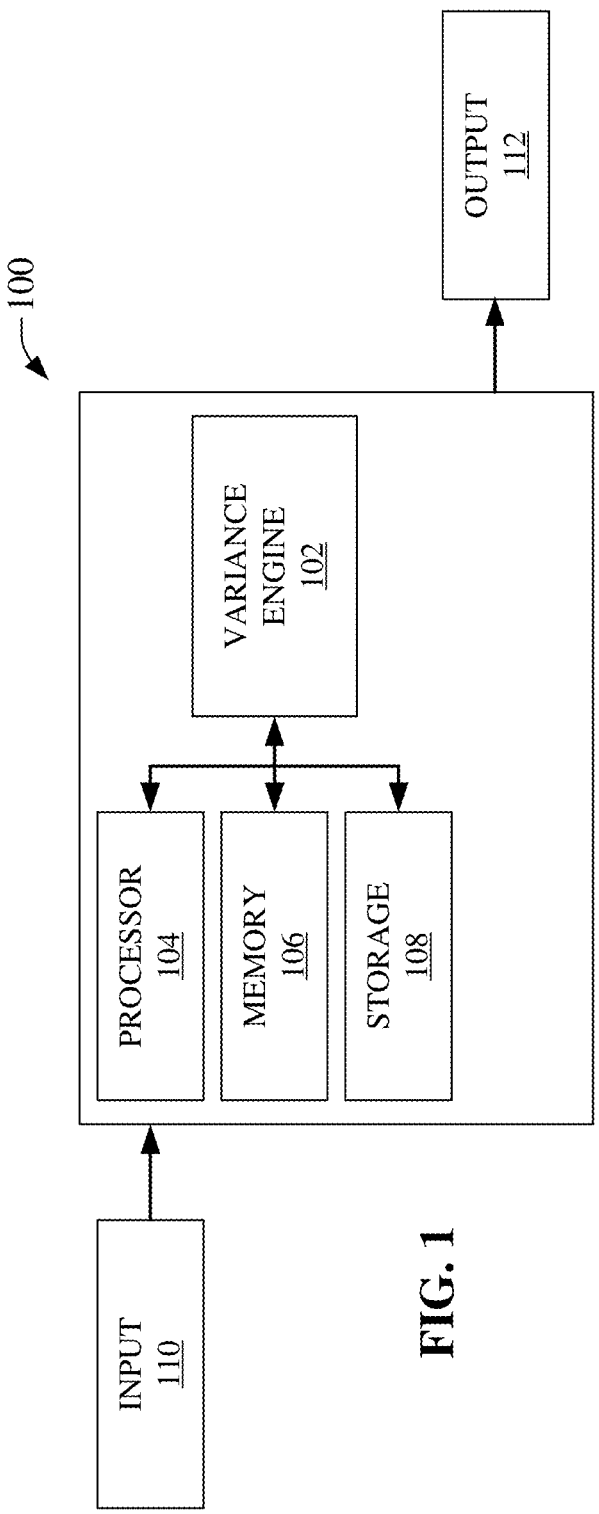
FIG. 1 illustrates a block diagram of a system for revealing and/or reproducing race conditions, in accordance with various example embodiments.

Aspects of the subject disclosure will now be described more fully hereinafter with reference to the accompanying drawings in which example embodiments are shown. In the following description, for purposes of explanation, numerous specific details are set forth in order to provide a thorough understanding of the various embodiments. However, the subject disclosure may be embodied in many different forms and should not be construed as limited to the example embodiments set forth herein.

The subject application discloses processes for exposing, revealing, and reproducing a class of software bugs referred to as 'race conditions.' Race conditions can be difficult to expose and reproduce at runtime (e.g., a time during which software is in execution), and they can affect systems because of the ubiquitous use of multithreading. Race conditions are by nature stochastic, and, in some instances, the probability or likelihood of revealing and rectifying them prior to shipping production software code can be low. The subject application in accordance with one or more disclosed embodiments therefor, provides an assignment of specific and specified functions among a computer's various and varied components to improve revealing, exposing, and/or reproducing race conditions, and in so doing enhancing processor utilization and throughput, improving memory utilization, and reducing synchronization issues (e.g., mistimed memory and/or resource allocations, mismanaged resource lock states, . . . ) associated with multitasking processes and/or multitasking operating systems.

The systems and processes disclosed and described herein raise the probability or likelihood of detecting race conditions by adding a tunable amount of variance to software code interleaving. The described systems and processes instrument operating system synchronization and scheduling mechanisms (e.g., mutual exclusion (mutex) implementations, thread schedulers, and the like) to affect the timing and scheduling of a program's execution without having to actually instrument the software code itself. The term "instrument" or "instrumenting" in the context of the subject application can be construed as the incorporation of code instructions (or code fragments) to monitor or measure performance of software in execution; to diagnose errors associated with software in execution; and/or to write trace data (log data, record data, . . . ) regarding software while the software is in execution.

As persons having ordinary skill in the art will appreciate, a race condition can cause erroneous behavior with only a small grouping of code interleaving that can occur irregularly with low or near negligible probabilities. The disclosed systems and processes raise the probability or likelihood of exposing these race conditions by adding variance to code interleaving which can adjust (e.g., lengthen or shorten) a time window (e.g., a race window) during which an adverse interleaving can occur. To illustrate the foregoing, suppose there is a software coding error that fails to address, in a small set or grouping of situations, where a software thread drops a lock, then the thread reacquires the lock shortly thereafter, but the thread does not revalidate the state that the lock was protecting. If the 'race window' associated with this situation (e.g., the thread does not hold the lock) is small, then it can be difficult to reveal and resolve such a race condition. The consequences of not being able to expose and resolve such a race condition can have dire and cascading results when such code is ultimately executed in a production environment. Accordingly, in this instance, by instrumenting the locking mechanism that the thread uses, the race window associated with the race condition can be adjusted (extended or shortened), giving a variable timing for another distinct thread to invalidate the state protected by the lock. Thus, by variably adjusting a race window associated with a race condition the greater the probability or likelihood of hitting as yet undetected race conditions during the testing phase of software code testing. Additionally, by variably adjusting the durations associated with race windows the specific conditions that can give rise to the identification of race conditions can be observed and replicated and/or reproduced with regularity with the aim of remedying the identified race condition.

One mechanism that can be used by the disclosed and described systems and methods to expose and/or reproduce software race conditions is to add random amounts of sleep (e.g., placing a process in execution or a thread in execution in a sleep state; a state of stasis; or a state of hiatus) in a particular or specific code path. This can be accomplished by using a tunable probability value with which execution of an operating system's synchronization mechanisms (e.g., the 'lock' routine for the operating system's mutual exclusion implementation) can be delayed, and thereafter based on, or as a function of, the tunable probability value causing the routine associated with operating system's synchronization mechanisms to be delayed for a defined or tunable random period of time. It should be noted in the context of introducing random amounts of sleep in a particular code path based on a probabilistically determined likelihood of a thread in execution's use of the synchronization mechanisms of the underlying operating system, that in order to obviate and/or avoid recursion, a flag condition or a thread condition can be used in conjunction with the introduction of a sleep mechanism. Additionally, a semaphore concept can also be used with equal facility and/or functionality to avoid issues of recursion in regard to the introduction of defined or definable sleep time periods to specific identified code paths.

An additional and/or alternative mechanism that can be used to expose and/or reproduce software race conditions can be to add random periods of "spin" or "lag" (e.g., placing the process in execution or thread in execution in a loop state for a period of time defined or definable, for example, by a loop counter—as will be appreciated by those skilled in the art, the process in execution or the thread in execution in this instance remains in execution and is not placed in a non-executing state (e.g., sleep, stasis, hiatus, . . . )). The determination as to whether to add random, but defined or definable, periods of spin or lag can be ascertained based on a tunable probability value associated with an operating system's synchronization mechanisms being invoked, and as a function of, or based on, the tunable probability, placing the routine associated with operating system's synchronization mechanisms in a loop cycle for a defined or tunable number of loop cycles (e.g., use a loop counter). Once again it should be noted without limitation or loss of generality in the context of introducing loop cycles in the path of particular code based at least on a probabilistically determined likelihood that a thread in execution uses the synchronization mechanisms of the underlying operating system, that in order to avoid recursion, a flag condition or a thread condition can be used in conjunction with the loop counter. Additionally, a semaphore concept can also be used with equal facility and/or functionality to avoid issues of recursion in regard to the introduction of defined or definable lag periods to specific identified code paths.

In order to inject or introduce the spin mechanisms and/or sleep mechanisms to expose and/or reproduce software race conditions into a user space program and/or the operating system kernel, a mechanism that can add code points in a controlled fashion to code can be used. One illustrative and contemplated mechanism that can be employed is the fail point mechanism that is generally available in most multitasking multiuser computer operating systems, such as distributions of Unix, Linux, FreeBSD, etc.

In order to switch the spin mechanisms and/or sleep mechanisms introduced to expose and/or reproduce software race conditions on and off and/or to tune its settings (e.g., define the length of sleep periods and/or define the number of loops to complete prior to exiting a defined loop) from user space, a software utility that reads and/or modifies attributes (e.g., operating system kernel version number, maximum limits, security settings, etc.) associated with the operating system kernel can be used. For instance, in an example implementation of the disclosed application, the "sysctl" utility in conjunction with a scripting language script or an interpreted high level programming language for general purpose programming (e.g., Python) has been used to turn the system for exposing and/or reproducing software race conditions on and off and to tune settings associated with the system.

The disclosed systems and methods, in accordance with various embodiments, provide a system, apparatus, or device comprising: a processor; and a memory that stores executable instructions that, when executed by the processor, facilitate performance of operations. The operations can comprise: identifying a synchronization mechanism of a grouping of operating system synchronization mechanisms; based on a tunable probability value, adjusting a race window associated with the synchronization mechanism; and based on the race window, increasing a likelihood of revealing a race condition.

Additional operations can comprise assigning the tunable probability value to the synchronization mechanism; adjusting the race window as a function of defining a sleep time period to place use of the synchronization mechanism in a hiatus state; and adjusting the race window as a function of defining a spin time period within which use of the synchronization mechanism is adjusted.

In regard to the foregoing, the software in execution can comprise a collection of threads that can be running in parallel. The synchronization mechanism can be at least an operating system resource allocation lock request; an operating system lock acquisition request; and/or a conditional variable event associated with a sleep state.

In accordance with further embodiments, the subject disclosure describes a method, comprising a series of acts that can include: identifying a synchronization mechanism of a grouping of operating system synchronization mechanisms; based on a tunable probability value, adjusting a race window associated with the synchronization mechanism; and based on the race window, increasing a likelihood of exposing a race condition.

Additional acts that can be performed can comprise: allocating the tunable probability value to the synchronization mechanism; adjusting the race window as a function of defining a stasis time period to elapse prior to facilitating use of the synchronization mechanism; and adjusting the race window as a function of defining a lag time period during which use of the synchronization mechanism is operational.

In accordance with still further embodiments, the subject disclosure describes a machine readable storage medium, a computer readable storage device, or non-transitory machine readable media comprising instructions that, in response to execution, cause a computing system comprising at least one processor to perform operations. The operations can comprise: identifying a synchronization mechanism of a grouping of operating system synchronization mechanisms; based on a tunable probability value, adjusting a race window associated with the synchronization mechanism; and based on the race window, raising a likelihood of revealing a race condition.

Further operations can include: adjusting the race window as a function of defining a spin time period during which use of the synchronization mechanism is operational; and adjusting the race window as a function of defining a stasis time period needed to elapse prior to facilitating use of the synchronization mechanism Now in reference to the Figures. FIG. 1 depicts a system 100 that provides for revealing and/or reproducing race conditions, in accordance with various example embodiments. System 100 can for purposes of illustration, can be any type of mechanism, machine, device, facility, apparatus, and/or instrument that includes a processor and/or is capable of effective and/or operative communication with a wired and/or wireless network topology. Mechanisms, machines, apparatuses, devices, facilities, and/or instruments that can comprise system 100 can include tablet computing devices, handheld devices, server class computing devices, machines, and/or databases, laptop computers, notebook computers, desktop computers, cell phones, smart phones, consumer appliances and/or instrumentation, industrial devices and/or components, hand-held devices, personal digital assistants, multimedia Internet enabled phones, multimedia players, and the like.

System 100 can comprise variance engine 102 that can be in operative communication with processor 104, memory 106, and storage 108. Variance engine 102 can be in communication with processor 104 for facilitating operation of computer-executable instructions or machine-executable instructions and/or components by variance engine 102, memory 106 for storing data and/or computer-executable instructions and/or machine-executable instructions and/or components, and storage 108 for providing longer term storage of data and/or machine-readable instructions and/or computer-readable instructions. Additionally, system 100 can also receive input 110 for use, manipulation, and/or transformation by variance engine 102 to produce one or more useful, concrete, and tangible result, and/or transform one or more articles to different states or things. Further, system 100 can also generate and output the useful, concrete, and tangible result and/or the transformed one or more articles as output 112.

System 100 in conjunction with variance engine 102 can raise the probability or likelihood of detecting race conditions by adding a tunable amount of variance to software code interleaving. Variance engine 102 can instrument operating system synchronization and scheduling mechanisms (e.g., mutual exclusion (mutex) implementations, thread schedulers, and the like) to affect the timing and scheduling of a program's execution without having to actually instrument the software code itself.

Variance engine 102 can raise the probability or likelihood of exposing race conditions by adding variance to code interleavings which can adjust (e.g., lengthen or shorten) a time window (e.g., a race window) during which an adverse interleaving can occur. For example, if there is a software coding error that fails to address a situation where a software thread drops a lock and subsequently thereafter the thread reacquires the lock, but the thread does not revalidate the state that the lock was protecting. Variance engine 102, by instrumenting the locking mechanism that the thread uses, a race window associated with the race condition can be adjusted giving a variable timing for another distinct thread to invalidate the state protected by the lock. Thus, by variably adjusting a race window associated with a race condition variance engine 102 can increase the probability of hitting an as yet undetected race condition during a testing phase of software code testing. Additionally, by variably adjusting the durations associated with race windows variance engine 102 can ensure that the specific conditions that can give rise to the identification of race conditions can be observed and replicated and/or reproduced with regularity with the ultimate aim of remedying the identified race condition.

One mechanism that can be used by variance engine 102 to expose and/or reproduce software race conditions is to add random amounts of sleep (e.g., placing a process in execution or a thread in execution in a sleep state; a state of stasis; or a state of hiatus) in a particular or specific code path. Variance engine 102 accomplishes the foregoing by using a tunable (e.g., adjustable) probability value with which an operating system's synchronization mechanisms (e.g., the 'lock' routine for the operating system's mutual exclusion implementation) can be delayed, and thereafter based on, or as a function of, the tunable probability value, variance engine 102 can cause the routine associated with operating system's synchronization mechanisms to be delayed for a defined or tunable random period of time. As noted earlier and in the context of introducing random amounts of sleep in a particular code path based on a probabilistically determined likelihood of a thread in execution's use of the synchronization mechanisms of the underlying operating system, in order to obviate and/or avoid recursion, variance engine 102 can employ a flag condition or a thread condition in conjunction with the introduction of a sleep mechanism. Additionally, variance engine 102 can also use a semaphore concept with equal facility and/or functionality to avoid issues of recursion in regard to the introduction of defined or definable sleep time periods to specific identified code paths.

In an additional and/or alternative embodiment variance engine 102 can introduce various random periods of lag or spin to expose and/or reproduce software race condition. In this instance, variance engine 102 can place a process in execution or thread in execution in a loop state for a period of time defined or definable, for example, by a loop counter. As will be appreciated by those skilled in the art, the process in execution or the thread in execution in this situation remains in execution and is not placed in a non-executing state (e.g., sleep, stasis, hiatus, . . . )). Variance engine 102 can determine whether to add random, but defined or definable, periods of spin or lag based on a tunable probability value that represents a likelihood of whether or not there are code paths that employ an operating system's synchronization mechanisms, and as a function of, or based on, the tunable probability value, variance engine 102, for example by use of a counter, can place the routine associated with operating system's mutual exclusion implementation in a loop cycle for a defined or tunable number of loop cycles. Once again it should be noted without limitation or loss of generality in the context of introducing loop cycles in the path of particular code based at least on a probabilistically determined likelihood that a thread in execution uses the synchronization mechanisms of the underlying operating system, that in order to avoid recursion, a flag condition or a thread condition can be used in conjunction with the loop counter. Additionally, a semaphore concept can also be used with equal facility and/or functionality to avoid issues of recursion in regard to the introduction of defined or definable lag periods to specific identified code paths.

In order to inject or introduce the spin mechanisms and/or sleep mechanisms to expose and/or reproduce software race conditions into a user space program and/or the operating system kernel, variance engine 102 can facilitate use a mechanism that can add code points in a controlled fashion to code. One illustrative and contemplated mechanism that can be employed by variance engine 102 is the fail mechanism that is generally available in most multitasking multiuser computer operating systems, such as distributions of Unix, Linux, FreeBSD, etc.

In order to switch the spin mechanisms and/or sleep mechanisms introduced to expose and/or reproduce software race conditions on and off and/or to tune its settings (e.g., define the length of sleep periods and/or define the number of loops to complete prior to exiting a defined loop) from user space, variance engine 102 can facilitate use of a software utility that reads and/or modifies attributes (e.g., operating system kernel version number, maximum limits, security settings, etc.) associated with the operating system kernel can be used. For instance, in an example implementation of the disclosed application, variance engine 102 can facilitate use of the "sysctl" utility in conjunction with a scripting language script or an interpreted high level programming language for general purpose programming to turn the system for exposing and/or reproducing software conditions (e.g., system 100) on and off, and to tune parameters associated with the system.

Figure 2:
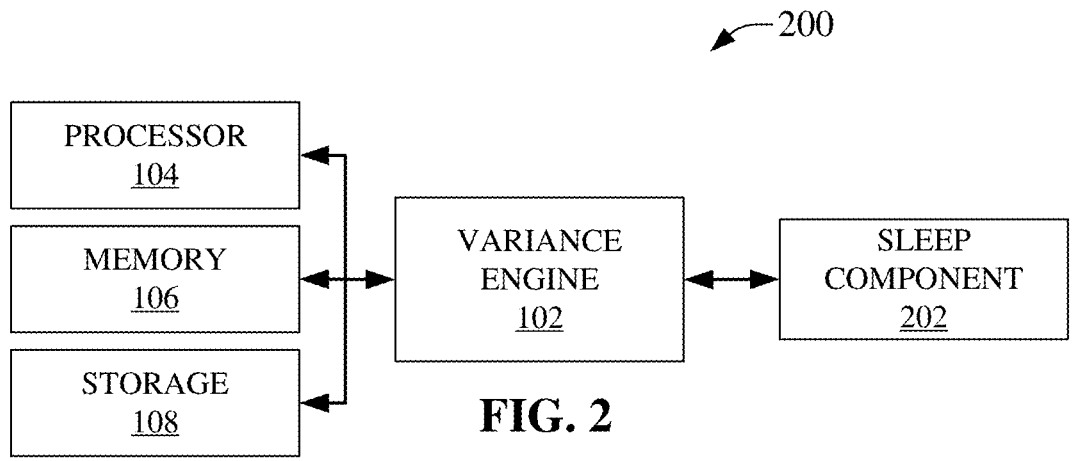
FIG. 2 illustrates an additional system for revealing and/or reproducing race conditions, in accordance with various example embodiments.

FIG. 2 provides further depiction of system 100, now depicted as system 200, that provides for revealing and/or reproducing race conditions, in accordance with various example embodiments. System 200, as illustrated, can comprise sleep component 202 that in collaboration with variance engine 102, processor 104, memory 106, and storage 108 to add random amounts of sleep in a particular or specific code path. Sleep component 202 can accomplish the foregoing by using a tunable probability value with which an operating system's synchronization mechanisms are invoked, and then based on, or as a function of, the tunable probability value can cause a routine associated with the operating system's synchronization mechanisms to be delayed for a defined or tunable random period of time. In regard to the introduction of random amounts of sleep in a particular code path based on a probabilistically determined likelihood of a thread in execution's use of the synchronization mechanisms of the underlying operating system, care must be taken to obviate and/or avoid recursion. Thus, sleep component 202 can use a flag condition, a thread condition, and/or a semaphore concept to avoid issues of recursion.

Figure 3:
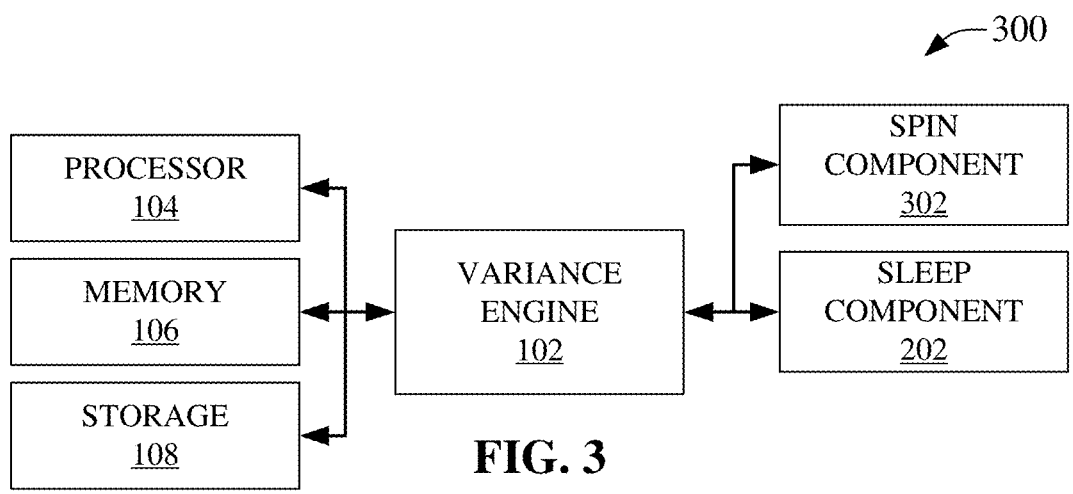
FIG. 3 illustrates yet a further system for revealing and/or reproducing race conditions, in accordance with various example embodiments.

FIG. 3 provides further illustration of system 100, now referenced as system 300, that provides for revealing and/or reproducing race conditions, in accordance with various example embodiments. System 300, as depicted, can comprise introducing various random but defined and/or definable periods of lag or spin to expose and/or reproduce software race condition via spin component 302. Spin component 302 can operate in conjunction with sleep component 202, verification engine 102, processor 104, memory 106, and storage 108. In this instance, spin component 102 can place a process in execution or thread in execution in a loop state for a period of time defined or definable, for example, by a loop counter. As will be appreciated by those skilled in the art, the process in execution or the thread in execution in this situation remains in execution and is not placed in a non-executing state (e.g., sleep, stasis, hiatus, . . . )). Spin component 302, similar to sleep component 202, can determine whether to add random, but defined or definable, periods of spin or lag based on a tunable probability value as to a likelihood of whether or not an operating system's synchronization mechanisms will be invoked, and as a function of, or based on, the tunable probability value, spin component 302, for example through use of a counter, can place the routine associated with operating system's synchronization mechanisms in a loop cycle for a defined or tunable random number of loop cycles. Once again it should be observed without limitation or loss of generality in the context of introducing loop cycles in the path of particular code based at least on a probabilistically determined likelihood that a thread in execution uses the synchronization mechanisms of the underlying operating system, that in order to avoid recursion, a flag condition, a thread condition, or a semaphore concept can be used in conjunction with the loop counter to obviate issues of recursion in regard to the introduction of defined or definable lag periods to the probabilistically identified code paths.

Figure 4:
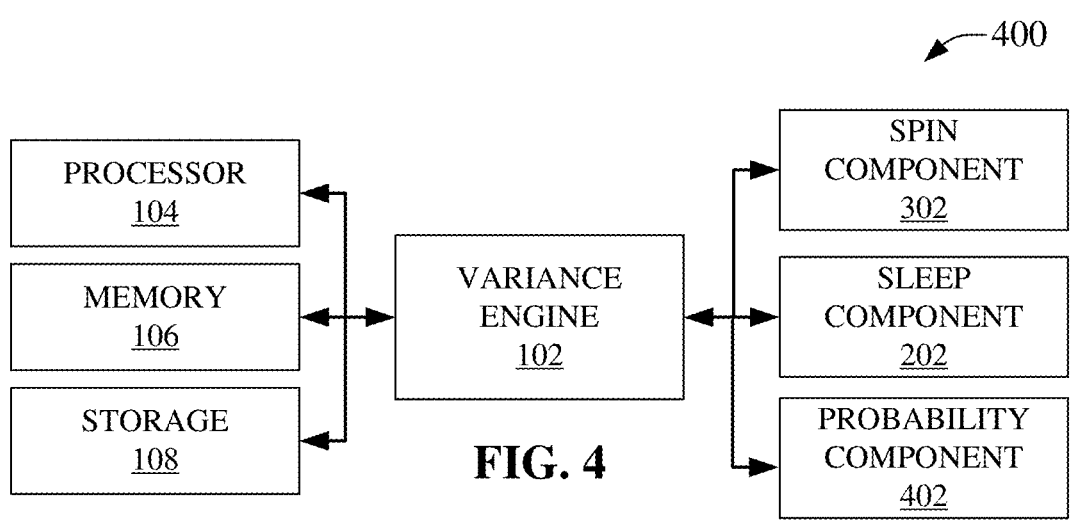
FIG. 4 depicts a further system for revealing and/or reproducing race conditions, in accordance with various example embodiments.

FIG. 4 provides additional illustration of system 100, now referenced as system 400, that provides for revealing and/or reproducing race conditions, in accordance with various example embodiments. System 400, as illustrated, can comprise probability component 402 that can operate in collaboration with sleep component 202 and/or spin component 302 to assign or allocate a tunable probability value to use of an operating system's synchronization mechanisms, and as a function of, or based on, the tunable probability value, sleep component 202 and/or spin component 302 can place the routine associated with operating system's synchronization mechanisms in either a sleep state and/or a loop cycle for a defined or tunable random number of loop cycles.

Figure 5:
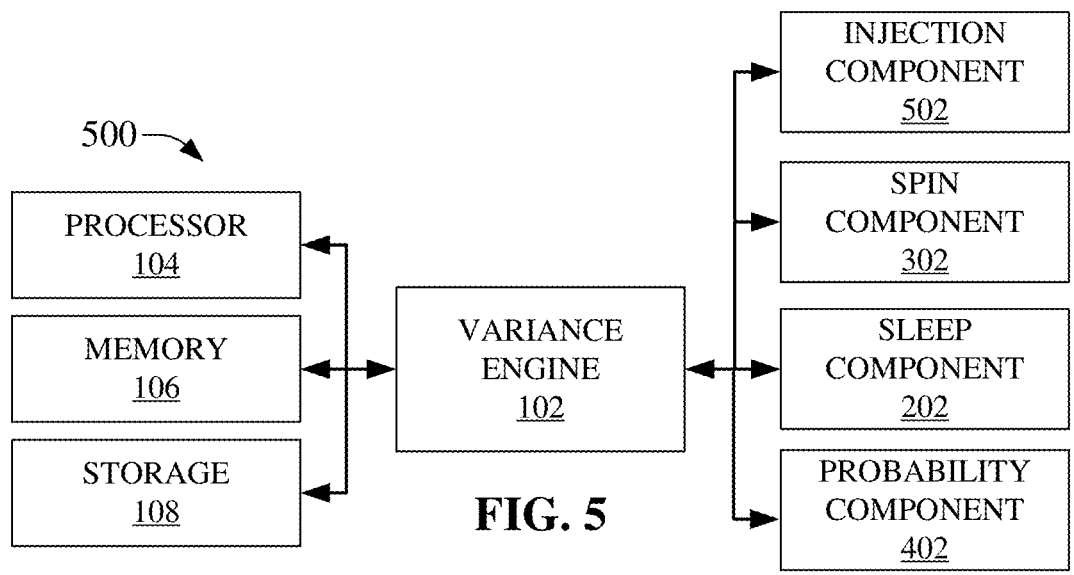
FIG. 5 illustrates another system for revealing and/or reproducing race conditions, in accordance with various example embodiments.

FIG. 5 provides yet further depiction of system 100, referenced now as system 500, that provides for revealing and/or reproducing race conditions, in accordance with various example embodiments. System 500, as depicted, can comprise injection component 502 that can operate in conjunction with spin component 302, sleep component 202, variance engine 102, processor 104, memory 106, and/or storage 108 to inject or introduce the spin mechanisms and/or sleep mechanisms to adjust race windows in order to expose and/or reproduce software race conditions into a user space program and/or the operating system kernel, injection component 502 can facilitate use a mechanism that can add code points in a controlled fashion to code. One illustrative and contemplated mechanism that has successfully been used by system 100 (and injection component 502) is the fail mechanism that is generally available in most multitasking multiuser computer operating systems, such as distributions of Unix, Linux, FreeBSD, etc.

Figure 6:
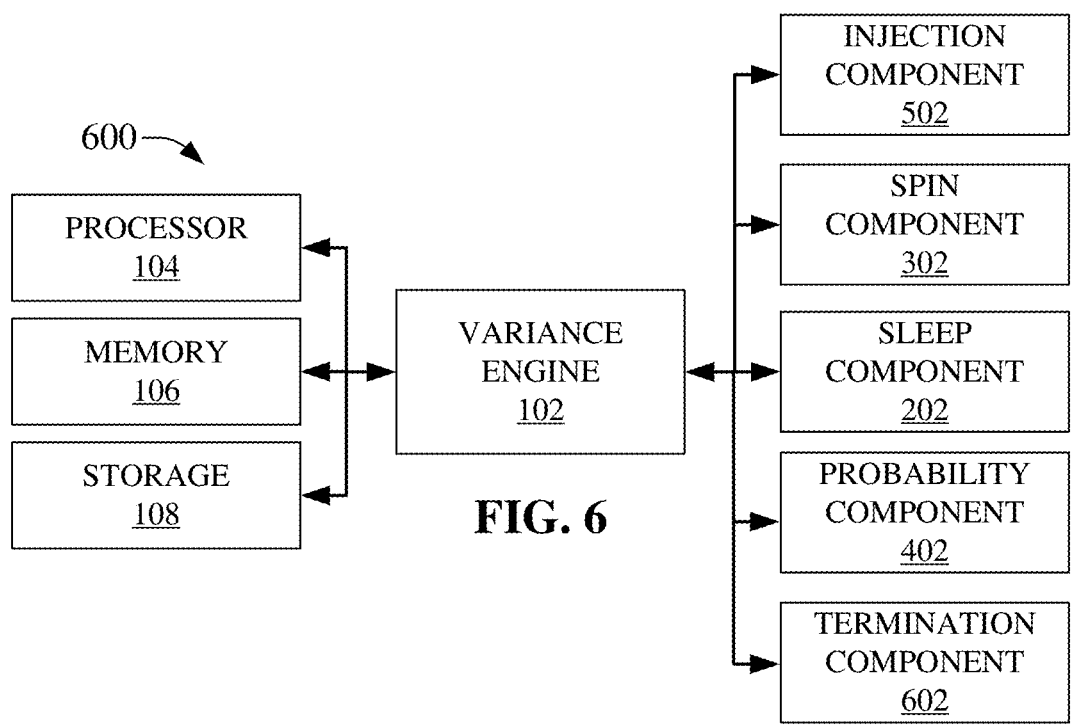
FIG. 6 illustrates a yet another system for revealing and/or reproducing race conditions, in accordance with various example embodiments.

FIG. 6 provides additional depiction of system 100, referenced as system 600, that provides for revealing and/or reproducing race conditions, in accordance with various example embodiments. System 600 can include termination component 602 that in conjunction with spin component 302, sleep component 202, variance engine 102, processor 104, memory 106, and/or storage 108 can switch the spin mechanisms and/or sleep mechanisms, introduced to facilitate adjustment of race windows to expose and/or reproduce software race conditions, on and off, and/or to tune the spin mechanisms and or the sleep mechanisms settings from user space. Termination component 602 can facilitate use of a software utility that reads and/or modifies attributes associated with the operating system kernel. For instance, in an example implementation of the disclosed application, termination component 602 facilitated use of the "sysctl" utility in conjunction with a scripting language script or an interpreted high level programming language for general purpose programming to turn the system for exposing and/or reproducing software conditions on and off. Use of the sysctl utility by termination component 602, in collaboration of a scripting language script or an interpreted high level programming language for general purpose programming, has also been used to tune parameters associated with the system.

Figure 9:
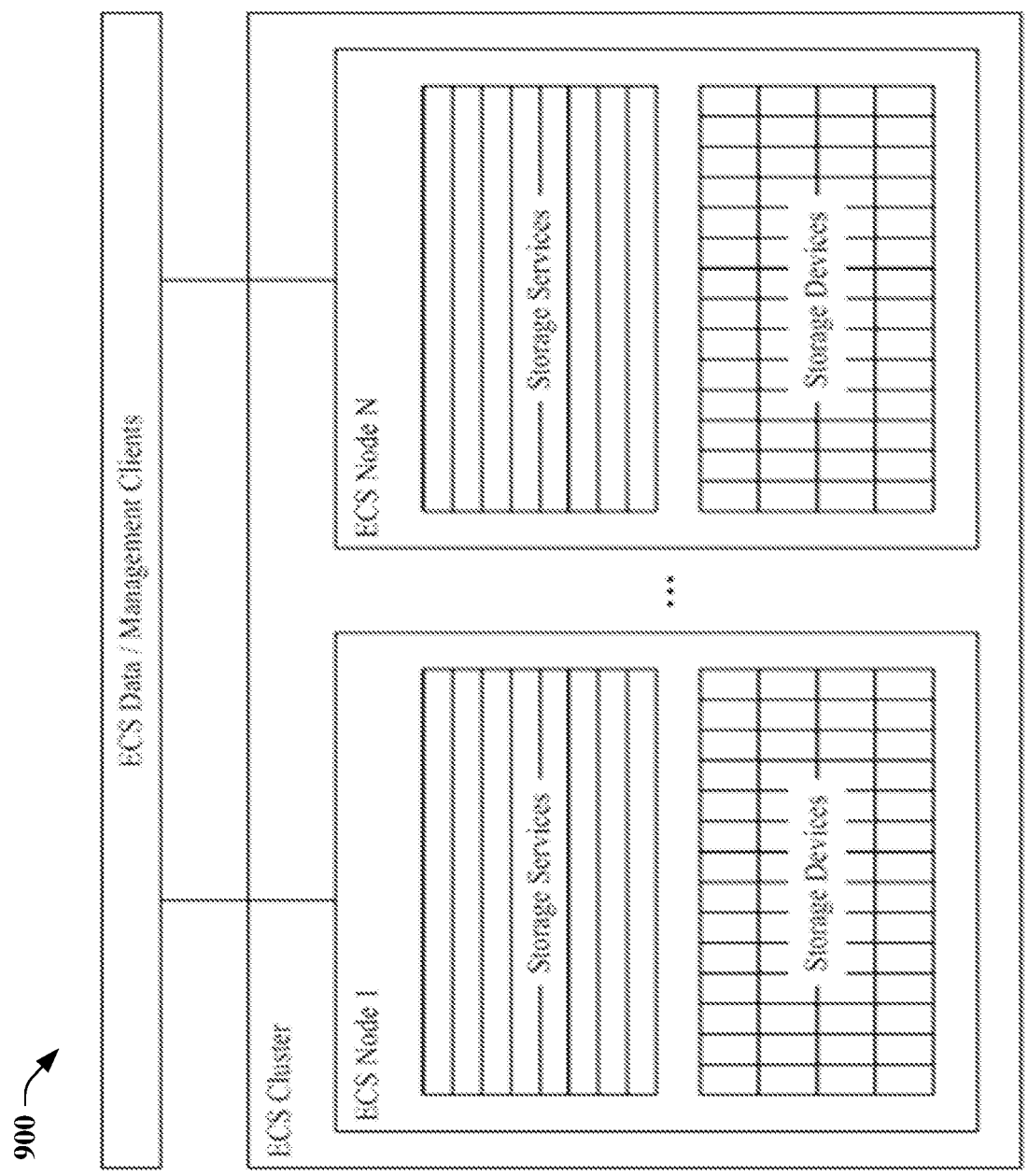
FIG. 9 illustrates an elastic cloud storage (ECS) system, in accordance with various example embodiments.

FIG. 9 illustrates an ECS storage system comprising a cloud-based object storage appliance in which corresponding storage control software comprising, e.g., ECS data client(s), ECS management client(s), storage service(s), etc. and storage media, e.g., physical magnetic disk media, storage devices, etc. of respective ECS nodes of an ECS cluster, are combined as an integrated system with no access to the storage media other than through the ECS system.

In this regard, an ECS cluster comprises multiple nodes, storage nodes, ECS nodes, etc. Each node is associated with storage devices, e.g. hard drives, physical disk drives, storage media, etc. In embodiment(s), an ECS node executing on a hardware appliance can be communicatively coupled, connected, cabled to, etc., e.g., 15 to 120 storage devices. Further, each ECS node can execute one or more services for performing data storage operations described herein.

The ECS system is an append-only virtual storage platform that protects content from being erased or overwritten for a specified retention period. In particular, the ECS system does not employ traditional data protection schemes like mirroring or parity protection. Instead, the ECS system utilizes erasure coding for data protection, wherein data, a portion of the data, e.g., a data chunk, is broken into fragments, and expanded and encoded with redundant data pieces and then stored across a set of different locations or storage media, e.g., across different storage nodes.

The ECS system can support storage, manipulation, and/or analysis of unstructured data on a massive scale on commodity hardware. As an example, the ECS can support mobile, cloud, big data, and/or social networking applications. In another example, the ECS can be deployed as a turnkey storage appliance, or as a software product that can be installed on a set of qualified commodity servers and disks, e.g., within a node, data storage node, etc. of a cluster, data storage cluster, etc. In this regard, the ECS can comprise a cloud platform that comprises at least the following features: (i) lower cost than public clouds; (ii) unmatched combination of storage efficiency and data access; (iii) anywhere read/write access with strong consistency that simplifies application development; (iv) no single point of failure to increase availability and performance; (v) universal accessibility that eliminates storage silos and inefficient extract, transform, load (ETL)/data movement processes; etc.

In embodiment(s), the cloud-based data storage system can comprise an object storage system, e.g., a file system comprising, but not limited to comprising, a Dell EMC® Isilon file storage system. As an example, a storage engine can write all object-related data, e.g., user data, metadata, object location data, etc. to logical containers of contiguous disk space, e.g., such containers comprising a group of blocks of fixed size (e.g., 128 MB) known as chunks. Data is stored in the chunks and the chunks can be shared, e.g., one chunk can comprise data fragments of different user objects. Chunk content is modified in append-only mode, e.g., such content being protected from being erased or overwritten for a specified retention period. When a chunk becomes full enough, it is sealed, closed, etc. In this regard, content of a sealed, closed, etc. chunk is immutable, e.g., read-only, and after the chunk is closed, the storage engine performs erasure-coding on the chunk.

Figure 7:
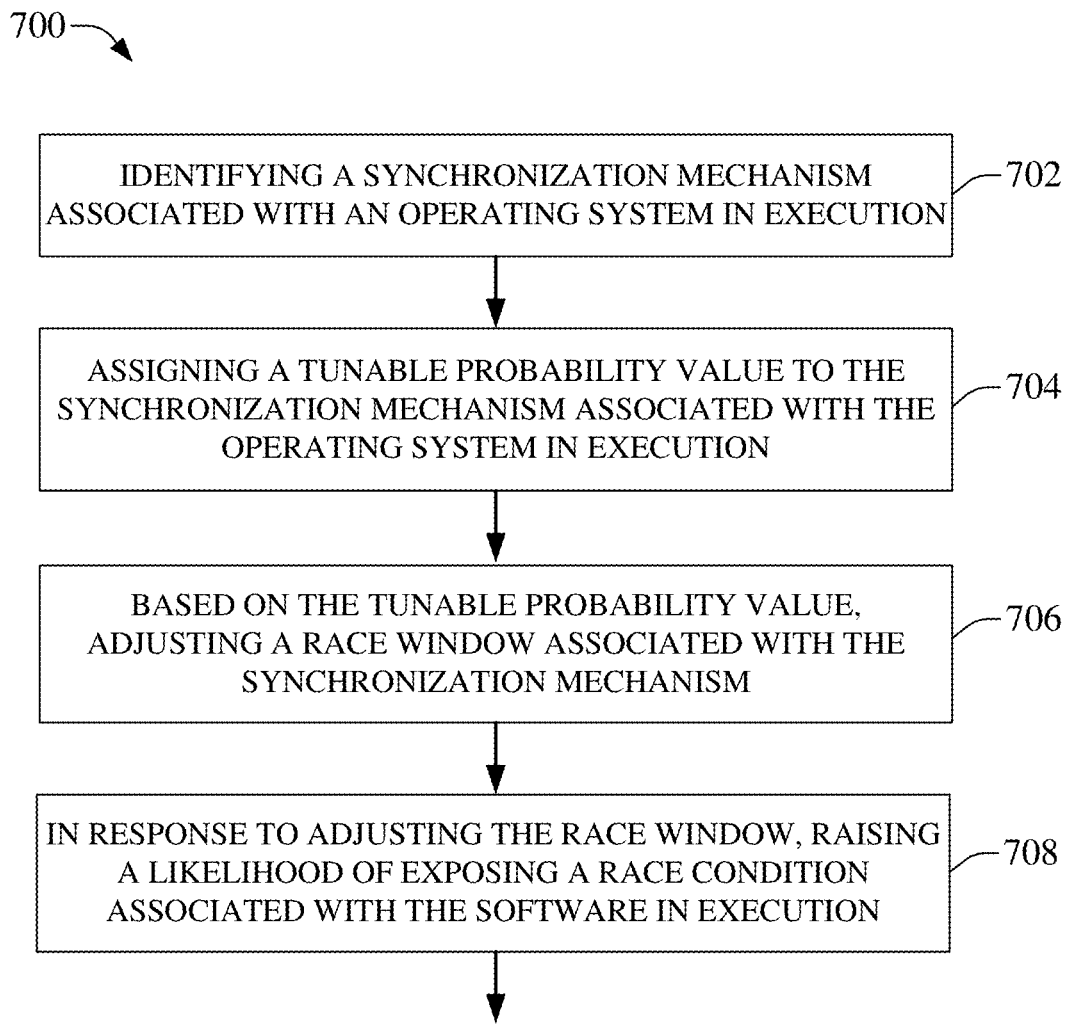
FIG. 7 illustrates a flow chart of a method for revealing and/or reproducing race conditions, in accordance with various example embodiments.
Figure 8:
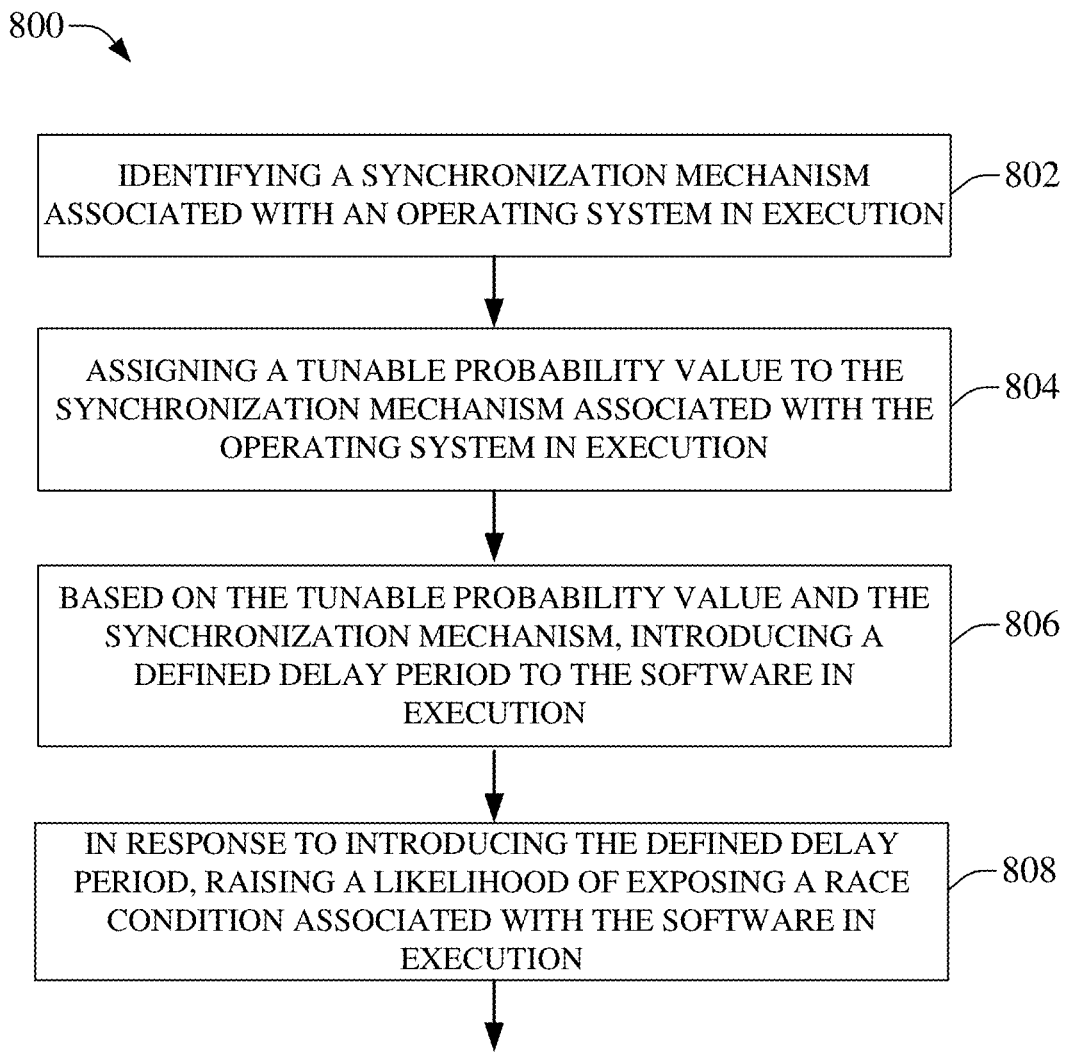
FIG. 8 illustrates a further flow chart of a method for revealing and/or reproducing race conditions, in accordance with various example embodiments.

FIGS. 7-8 illustrate methodologies for performing operations corresponding to system 100, in accordance with various example embodiments. For simplicity of explanation, the methodologies are depicted and described as a series of acts. It is to be understood and appreciated that various embodiments disclosed herein are not limited by the acts illustrated and/or by the order of acts. For example, acts can occur in various orders and/or concurrently, and with other acts not presented or described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Referring now to FIG. 7, a methodology 700 for revealing and/or reproducing race conditions is illustrated, in accordance with various example embodiments. The method 700 can commence at act 702 where one or more synchronization mechanism associated with an operating system in execution can be identified (e.g., by system 100 and in particular variance engine 102). At 704 a tunable probability value that a code path uses the one or more synchronization mechanism associated with the operating system in execution can be assigned by variance engine 102. At 706, variance engine 102, and based on the tunable probability value, can adjust (e.g., extend or shorten) a race window associated with the operating system synchronization mechanism. At 708, variance engine 102, in response to adjusting the race window, can raise the likelihood of revealing a race condition associated with the software in execution.

FIG. 8 depicts a further methodology 800 for revealing and/or reproducing race conditions is illustrated, in accordance with various example embodiments. The method 800 can commence at act 802 where synchronization mechanisms associated with an operating system in execution can be identified (e.g., by variance engine 102). At 804, variance engine 102 can assign tunable probability values to the synchronization mechanisms associated with the operating system in execution. An example of such a synchronization mechanism can include wait locks on resource allocations, such memory allocation (e.g., the malloc operating system function). At 806, variance engine 102, in response to assigning the tunable probability value, and based on the tunable probability value, can adjust (e.g., extend or shorten) a race window by introducing a defined delay period (e.g., a spin cycle and/or a sleep period) to operate in collaboration with the synchronization mechanism, thereby adjusting a race window associated with the synchronization mechanism. At 808, variance engine 102, in response to adjusting the race window, can expose a race condition associated with the software in execution by raising the likelihood or probability of revealing the race condition.

Reference throughout this specification to "one embodiment," or "an embodiment," means that a particular feature, structure, or characteristic described in connection with the embodiment is included in at least one embodiment. Thus, the appearances of the phrase "in one embodiment," or "in an embodiment," in various places throughout this specification are not necessarily all referring to the same embodiment. Furthermore, the particular features, structures, or characteristics may be combined in any suitable manner in one or more embodiments.

Furthermore, to the extent that the terms "includes," "has," "contains," and other similar words are used in either the detailed description or the appended claims, such terms are intended to be inclusive—in a manner similar to the term "comprising" as an open transition word—without precluding any additional or other elements. Moreover, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As utilized herein, the terms "logic," "logical," "logically," and the like are intended to refer to any information having the form of instruction signals and/or data that may be applied to direct the operation of a processor. Logic may be formed from signals stored in a device memory. Software is one example of such logic. Logic may also be comprised by digital and/or analog hardware circuits, for example, hardware circuits comprising logical AND, OR, XOR, NAND, NOR, and other logical operations. Logic may be formed from combinations of software and hardware. On a network, logic may be programmed on a server, or a complex of servers. A particular logic unit is not limited to a single logical location on the network.

As utilized herein, terms "component," "system," "engine", and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server, client, etc. and the server, client, etc. can be a component. One or more components can reside within a process, and a component can be localized on one computer and/or distributed between two or more computers.

Further, components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. In yet another example, a component can be an apparatus that provides specific functionality through electronic components without mechanical parts; the electronic components can comprise one or more processors therein to execute software and/or firmware that confer(s), at least in part, the functionality of the electronic components.

Aspects of systems, apparatus, and processes explained herein can constitute machine-executable instructions embodied within a machine, e.g., embodied in a computer readable medium (or media) associated with the machine. Such instructions, when executed by the machine, can cause the machine to perform the operations described. Additionally, the systems, processes, process blocks, etc. can be embodied within hardware, such as an application specific integrated circuit (ASIC) or the like. Moreover, the order in which some or all of the process blocks appear in each process should not be deemed limiting. Rather, it should be understood by a person of ordinary skill in the art having the benefit of the instant disclosure that some of the process blocks can be executed in a variety of orders not illustrated.

Furthermore, the word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art having the benefit of the instant disclosure.

The disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can comprise, but are not limited to: random access memory (RAM); read only memory (ROM); electrically erasable programmable read only memory (EEPROM); flash memory or other memory technology (e.g., card, stick, key drive, thumb drive, smart card); solid state drive (SSD) or other solid-state storage technology; optical disk storage (e.g., compact disk (CD) read only memory (CD ROM), digital video/versatile disk (DVD), Blu-ray disc); cloud-based (e.g., Internet based) storage; magnetic storage (e.g., magnetic cassettes, magnetic tape, magnetic disk storage or other magnetic storage devices); a virtual device that emulates a storage device and/or any of the above computer-readable media; or other tangible and/or non-transitory media which can be used to store desired information. In this regard, the terms "tangible" or "non-transitory" herein as applied to storage, memory, or computer-readable media, are to be understood to exclude only propagating transitory signals per se as modifiers and do not relinquish rights to all standard storage, memory or computer-readable media that are not only propagating transitory signals per se.

Artificial intelligence based systems, e.g., utilizing explicitly and/or implicitly trained classifiers, can be employed in connection with performing inference and/or probabilistic determinations and/or statistical-based determinations as in accordance with one or more aspects of the disclosed subject matter as described herein. For example, an artificial intelligence system can be used to determine probabilistic likelihoods that code paths utilize operating system synchronization mechanism, as described herein.

A classifier can be a function that maps an input attribute vector, x=(x1, x2, x3, x4, xn), to a confidence that the input belongs to a class, that is, f(x)=confidence (class). Such classification can employ a probabilistic and/or statistical-based analysis (e.g., factoring into the analysis utilities and costs) to infer an action that a user desires to be automatically performed. In the case of communication systems, for example, attributes can be information received from access points, servers, components of a wireless communication network, etc., and the classes can be categories or areas of interest (e.g., levels of priorities). A support vector machine is an example of a classifier that can be employed. The support vector machine operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein can also be inclusive of statistical regression that is utilized to develop models of priority.

In accordance with various aspects of the subject specification, artificial intelligence based systems, components, etc. can employ classifiers that are explicitly trained, e.g., via a generic training data, etc. as well as implicitly trained, e.g., via observing characteristics of communication equipment, e.g., a server, etc., receiving reports from such communication equipment, receiving operator preferences, receiving historical information, receiving extrinsic information, etc. For example, support vector machines can be configured via a learning or training phase within a classifier constructor and feature selection module. Thus, the classifier(s) can be used by an artificial intelligence system to automatically learn and perform a number of functions, e.g., performed by variance engine 102.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

As it is employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

In the subject specification, terms such as "store," "data store," "data storage," "database," "storage medium," "socket", and substantially any other information storage component relevant to operation and functionality of a system, component, and/or process, can refer to "memory components," or entities embodied in a "memory," or components comprising the memory. It will be appreciated that the memory components described herein can be either volatile memory or nonvolatile memory, or can comprise both volatile and nonvolatile memory.

By way of illustration, and not limitation, nonvolatile memory, for example, can be included in a data storage cluster, non-volatile memory 1022 (see below), disk storage 1024 (see below), and/or memory storage 1046 (see below). Further, nonvolatile memory can be included in read only memory (ROM), programmable ROM (PROM), electrically programmable ROM (EPROM), electrically erasable ROM (EEPROM), or flash memory. Volatile memory 1020 can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Figure 10:
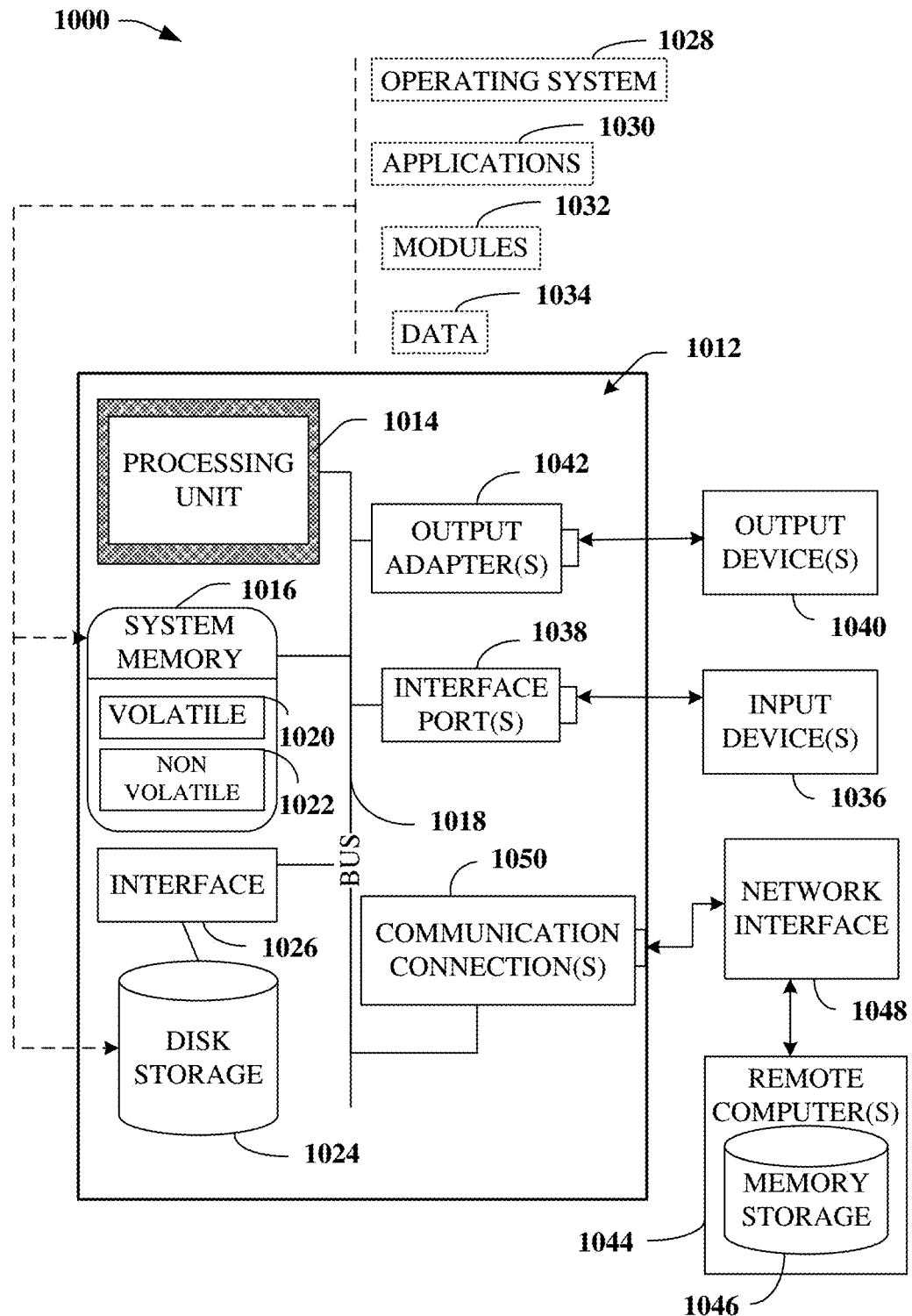
FIG. 10 illustrates a block diagram representing an illustrative non-limiting computing system or operating environment in which one or more aspects of various embodiments described herein can be implemented.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that various embodiments disclosed herein can be implemented in combination with other program modules. Generally, program modules comprise routines, programs, components, data structures, etc. that perform particular tasks and/or implement particular abstract data types.

Moreover, those skilled in the art will appreciate that the inventive systems can be practiced with other computer system configurations, comprising single-processor or multiprocessor computer systems, computing devices, mini-computing devices, mainframe computers, as well as personal computers, hand-held computing devices (e.g., PDA, phone, watch), microprocessor-based or programmable consumer or industrial electronics, and the like. The illustrated aspects can also be practiced in distributed computing environments where tasks are performed by remote processing devices that are linked through a communication network; however, some if not all aspects of the subject disclosure can be practiced on stand-alone computers. In a distributed computing environment, program modules can be located in both local and remote memory storage devices.

With reference to FIG. 10, a block diagram of a computing system 1000, e.g., system 100, operable to execute the disclosed systems and methods is illustrated, in accordance with an embodiment. Computer 1012 comprises a processing unit 1014, a system memory 1016, and a system bus 1018. System bus 1018 couples system components comprising, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) comprising a memory bus or a memory controller, a peripheral bus or an external bus, and/or a local bus using any variety of available bus architectures comprising, but not limited to, industrial standard architecture (ISA), micro-channel architecture (MSA), extended ISA (EISA), intelligent drive electronics (IDE), VESA local bus (VLB), peripheral component interconnect (PCI), card bus, universal serial bus (USB), advanced graphics port (AGP), personal computer memory card international association bus (PCMCIA), Firewire (IEEE 1394), small computer systems interface (SCSI), and/or controller area network (CAN) bus used in vehicles.

System memory 1016 comprises volatile memory 1020 and nonvolatile memory 1022. A basic input/output system (BIOS), containing routines to transfer information between elements within computer 1012, such as during start-up, can be stored in nonvolatile memory 1022. By way of illustration, and not limitation, nonvolatile memory 1022 can comprise ROM, PROM, EPROM, EEPROM, or flash memory. Volatile memory 1020 comprises RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1012 also comprises removable/non-removable, volatile/non-volatile computer storage media. FIG. 10 illustrates, for example, disk storage 1024. Disk storage 1024 comprises, but is not limited to, devices like a magnetic disk drive, floppy disk drive, tape drive, Jaz drive, Zip drive, LS-100 drive, flash memory card, or memory stick. In addition, disk storage 1024 can comprise storage media separately or in combination with other storage media comprising, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to system bus 1018, a removable or non-removable interface is typically used, such as interface 1026.

It is to be appreciated that FIG. 10 describes software that acts as an intermediary between users and computer resources described in suitable operating environment 1000. Such software comprises an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be appreciated that the disclosed subject matter can be implemented with various operating systems or combinations of operating systems.

A user can enter commands or information into computer 1012 through input device(s) 1036. Input devices 1036 comprise, but are not limited to, a pointing device such as a mouse, trackball, stylus, touch pad, keyboard, microphone, joystick, game pad, satellite dish, scanner, TV tuner card, digital camera, digital video camera, web camera, cellular phone, user equipment, smartphone, and the like. These and other input devices connect to processing unit 1014 through system bus 1018 via interface port(s) 1038. Interface port(s) 1038 comprise, for example, a serial port, a parallel port, a game port, a universal serial bus (USB), a wireless based port, e.g., Wi-Fi, Bluetooth, etc. Output device(s) 1040 use some of the same type of ports as input device(s) 1036.

Thus, for example, a USB port can be used to provide input to computer 1012 and to output information from computer 1012 to an output device 1040. Output adapter 1042 is provided to illustrate that there are some output devices 1040, like display devices, light projection devices, monitors, speakers, and printers, among other output devices 1040, which use special adapters. Output adapters 1042 comprise, by way of illustration and not limitation, video and sound devices, cards, etc. that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, a workstation, a microprocessor based appliance, a peer device, or other common network node and the like, and typically comprises many or all of the elements described relative to computer 1012.

For purposes of brevity, only a memory storage device 1046 is illustrated with remote computer(s) 1044. Remote computer(s) 1044 is logically connected to computer 1012 through a network interface 1048 and then physically and/or wirelessly connected via communication connection 1050. Network interface 1048 encompasses wire and/or wireless communication networks such as local-area networks (LAN) and wide-area networks (WAN). LAN technologies comprise fiber distributed data interface (FDDI), copper distributed data interface (CDDI), Ethernet, token ring and the like. WAN technologies comprise, but are not limited to, point-to-point links, circuit switching networks like integrated services digital networks (ISDN) and variations thereon, packet switching networks, and digital subscriber lines (DSL).

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can comprise, for example, internal and external technologies such as modems, comprising regular telephone grade modems, cable modems and DSL modems, wireless modems, ISDN adapters, and Ethernet cards.

The computer 1012 can operate in a networked environment using logical connections via wired and/or wireless communications to one or more remote computers, cellular based devices, user equipment, smartphones, or other computing devices, such as workstations, server computers, routers, personal computers, portable computers, microprocessor-based entertainment appliances, peer devices or other common network nodes, etc. The computer 1012 can connect to other devices/networks by way of antenna, port, network interface adaptor, wireless access point, modem, and/or the like.

The computer 1012 is operable to communicate with any wireless devices or entities operatively disposed in wireless communication, e.g., a printer, scanner, desktop and/or portable computer, portable data assistant, communications satellite, user equipment, cellular base device, smartphone, any piece of equipment or location associated with a wirelessly detectable tag (e.g., scanner, a kiosk, news stand, restroom), and telephone. This comprises at least Wi-Fi and Bluetooth wireless technologies. Thus, the communication can be a predefined structure as with a conventional network or simply an ad hoc communication between at least two devices.

Wi-Fi allows connection to the Internet from a desired location (e.g., a vehicle, couch at home, a bed in a hotel room, or a conference room at work, etc.) without wires. Wi-Fi is a wireless technology similar to that used in a cell phone that enables such devices, e.g., mobile phones, computers, etc., to send and receive data indoors and out, anywhere within the range of a base station. Wi-Fi networks use radio technologies called IEEE 802.11 (a, b, g, etc.) to provide secure, reliable, fast wireless connectivity. A Wi-Fi network can be used to connect communication devices (e.g., mobile phones, computers, etc.) to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:
a processor; and
a memory that stores executable instructions that, when executed by the processor, facilitate performance of operations comprising:
identifying a synchronization mechanism of a grouping of operating system synchronization mechanisms;
based on a tunable probability value, representing a probability of a conflict occurring between a first execution of the synchronization mechanism and a second execution of the synchronization mechanism, and a semaphore used to reduce recursion associated with the synchronization mechanism, increasing a duration of a race window associated with the synchronization mechanism, wherein the race window is increased by a delay period, wherein the race window operates in collaboration with the synchronization mechanism, wherein the tunable probability value further represents a first time duration prior to the first execution of the synchronization mechanism and a second time duration prior to the second execution of the synchronization mechanism, and wherein the first time duration differs from the second time duration; and
based on the race window having been increased and the delay period, increasing a likelihood of revealing a race condition.

2. The system of claim 1, wherein a software in execution comprises the synchronization mechanism.

3. The system of claim 1, wherein the operations further comprise assigning the tunable probability value to the synchronization mechanism.

4. The system of claim 1, wherein the synchronization mechanism is an operating system resource allocation lock request.

5. The system of claim 1, wherein the synchronization mechanism is an operating system lock acquisition request.

6. The system of claim 1, wherein the synchronization mechanism is a conditional variable event associated with a sleep state.

7. The system of claim 1, wherein the increasing of the race window comprises adjusting the race window as a function of defining a sleep time period to place use of the synchronization mechanism in a hiatus state.

8. The system of claim 1, wherein the increasing of the race window comprises adjusting the race window as a function of defining a spin time period within which use of the synchronization mechanism is adjusted.

9. A method comprising:
identifying, by a device comprising a processor, a synchronization mechanism of a grouping of operating system synchronization mechanisms;
based on a tunable probability value, representative of a probability of a conflict occurring between a first execution of the synchronization mechanism and a second execution of the synchronization mechanism, and use of a bit flag to reduce recursion associated with execution of the synchronization mechanism, increasing, by the device, a duration of a race window associated with the synchronization mechanism, wherein the race window is increased by a delay period, wherein the race window operates in collaboration with the synchronization mechanism, wherein the tunable probability value further represents a time value that differs between the first execution of the synchronization mechanism at a first code point in the recursion and the second execution of the synchronization mechanism at a second code point in the recursion; and
based on the race window having been increased and the delay period, increasing, by the device, a likelihood of exposing a race condition.

10. The method of claim 9, wherein a software in execution comprises the synchronization mechanism.

11. The method of claim 9, further comprising allocating, by the device, the tunable probability value to the synchronization mechanism.

12. The method of claim 9, wherein the synchronization mechanism is an operating system resource allocation lock request.

13. The method of claim 9, wherein the synchronization mechanism is an operating system lock acquisition request.

14. The method of claim 9, wherein the synchronization mechanism is a conditional variable event associated with a sleep state.

15. The method of claim 9, wherein the increasing of the race window comprises adjusting the race window as a function of defining a stasis time period to elapse prior to facilitating use of the synchronization mechanism.

16. The method of claim 9, wherein the increasing of the race window comprises adjusting the race window as a function of defining a lag time period during which use of the synchronization mechanism is operational.

17. A non-transitory machine-readable medium comprising instructions that, in response to execution, cause a system comprising a processor to perform operations comprising:
   identifying a synchronization mechanism of a grouping of operating system synchronization mechanisms;
   based on a tunable probability value, representing a probability of a conflict occurring between a first execution of the synchronization mechanism and a second execution of the synchronization mechanism, and a semaphore used to reduce recursion associated with the synchronization mechanism, increasing a duration of a race window associated with the synchronization mechanism, wherein the duration of the race window is increased by a delay period, wherein the race window operates in collaboration with the synchronization mechanism, wherein the tunable probability value further represents a time value that differs between the first execution of the synchronization mechanism at a first code point in the recursion and the second execution of the synchronization mechanism at a second code point in the recursion; and
   based on the race window having been increased and the delay period, raising a likelihood of revealing a race condition.

18. The non-transitory machine-readable medium of claim 17, wherein the increasing of the race window comprises adjusting the race window as a function of defining a stasis time period needed to elapse prior to facilitating use of the synchronization mechanism.

19. The non-transitory machine-readable medium of claim 17, wherein the increasing of the race window comprises adjusting the race window as a function of defining a spin time period during which use of the synchronization mechanism is operational.

20. The non-transitory machine-readable medium of claim 17, wherein a software in execution comprises the synchronization mechanism.

\* \* \* \* \*